United States Patent
> Allum et al.

[15] 3,673,114

[45] June 27, 1972

[54] DISPROPORTIONATION CATALYSTS

[72] Inventors: Keith George Allum, Bracknell; Peter John Robinson, Isleworth, both of England

[73] Assignee: The British Petroleum Company Limited, London, England

[22] Filed: Jan. 28, 1970

[21] Appl. No.: 6,560

[30] Foreign Application Priority Data

Feb. 7, 1969 Great Britain..................6,681/69

[52] U.S. Cl. ..................252/454, 252/455 R, 252/458, 260/683
[51] Int. Cl. ..................B01j 11/40
[58] Field of Search..............252/454, 458, 455 R; 260/683

[56] References Cited

UNITED STATES PATENTS 3,573,228  3/1971  Holmes et al...................252/454
3,471,586  10/1969  Lester...........................260/683

Primary Examiner—C. F. Dees
Attorney—Morgan, Finnegan, Durham & Pine

[57] ABSTRACT

A catalyst for the disproportionation of olefins is prepared by (i) adsorbing aluminum ions into silica (ii) adsorbing sodium ions and (iii) adsorbing ions of one or more of the metals rhenium, tungsten and molybdenum. The catalyst is activated by heating to 350° to 650° C. for up to 16 hours.

3 Claims, No Drawings

DISPROPORTIONATION CATALYSTS

This invention relates to novel materials suitable for use as disproportionation catalyst precursors, to catalysts obtained therefrom and to disproportionation processes in which they are used.

In the present specification a disproportionation catalyst is defined as a catalyst which is capable of effecting conversion of an olefin or acetylene to a mixture of compounds having higher and lower carbon numbers than the feed.

Disproportionation catalysts supported on or containing silica are known. For example, UK Pat. No. 1,093,784 discloses the use of rhenium oxide on silica as a disproportionation catalyst and Belgian Pat. No. 652,887 describes the use of molybdenum oxide or tungsten oxide on silica.

Further UK Pat. No. 993,710 discloses the use of a Group VIA metal carbonyl on silica, alumina or silica-aluminaas a disproportionation catalyst.

It is also known to prepare catalyst by methods involving ion exchange. UK Pat. specification No. 1,028,166 describes a process for the production of a catalyst which process comprises contacting silica or a material containing silica, the silica having hydrogen atoms in surface hydroxyl groups capable of ionizing and exchanging, with an ionic solution of a salt of metal of Group III of the Periodic Table, under conditions such that ions of the Group III metal are distributed over the surface of the silica in amount 0.01 – 3 percent by weight, expressed as a percent by weight of the silica of the Group III metal ion. The preferred Group III metal is aluminum.

UK Patent specification, No. 1,067,375 describes and claims a process in which the catalysts of Pat. No. 1,028,166 are modified by the addition of a metal, oxide or sulphide of Groups I, II and V to VII of the Periodic Table, the addition being either before or after the treatment with the Group III metal salt.

We have now found that when certain metal ions are adsorbed onto silica the products are useful as disproportionation catalyst precursors. By the term "precursor" we mean a material which on heating in an oxidizing gas to above 300° C gives a material having catalytic activity.

According to the present invention there is provided a process for the preparation of a composition suitable for use as a disproportionation catalyst precursor which process comprises contacting silica, the silica having hydrogen atoms in surface hydroxyl groups capable of ionizing and exchanging with an aqueous solution containing cations of one or more of the metals molybdenum, tungsten or rhenium under conditions such that the metal ions are adsorbed onto the surface of silica by ion exchange and thereafter washing with water to remove substantially all the chemically uncombined metal ions, and drying the composition so formed.

The present invention further provides a disproportionation process which comprises contacting a catalyst prepared as hereinbefore described with an olefin or acetylene feedstock under conditions of temperature and pressure such that disproportionation is effected.

By the term "metal cations" throughout the specification we mean to include in addition to the simple metal cations, the complex ions in which the metal is surrounded by or attached to other groups or ligands.

The catalysts according to the present invention are prepared by adsorbing the ions of the metals molybdenum, tungsten or rhenium onto the surface of the silica by ion exchange. The ion exchange may be effected by washing, percolation or soaking with a solution containing the metal ions to be absorbed. Suitable concentrations for all the ion exchange steps in the present invention are from 0.01 M to a saturated solution.

Before effecting the ion exchange with the molybdenum, tungsten or rhenium the silica may be first submitted to an ion exchange where the $H^+$ ions on the surface are exchanged for $Na^+$ ions, $K^+$ ions or ions of metals of Groups IA or 2A.

The preferred method is by percolation with an aqueous solution of the ions to be adsorbed in deionized water. The metal ions used in the exchange may be derived from a simple binary compound or from a compound containing the metal in a complex ion. Preferably the metal ions used in the exchange are complex ions.

An essential requirement for the present invention is the washing with water to remove uncombined metal cations. This washing must be carried out while the metal cations are still in a water-soluble state (i.e. before any decomposition or calcination step which would convert uncombined metal ions to a water insoluble state). The washing is continued until the wash water is free of metal ions. This applies whether a single washing stage is employed or whether a series of washing stages, each following exchange with different metals is carried out.

Any form of silica may be employed. Preferably the silica is silica gel.

Suitable amounts of molybdenum, tungsten or rhenium are 0.01 to 15 parts by weight expressed as metal per 100 parts of silica depending for example on the surface area and pore structure of the silica. Preferred amounts of molybdenum, tungsten or rhenium are 0.01 to 10 parts by weight expressed as metal per 100 parts of silica. Preferably the catalyst also contains adsorbed aluminum ions.

Preferably a rhenium compound is used for the second exchange. Suitable rhenium compounds are those containing the rhenium complex ions $(py_4Re^rO_3)+$(wherein py = pyridine), $Re(CO)_6^+$, $(en_xRe^rO_2)+$(wherein en =(ethylene diamine) and $Re(amine)_4O_2$. Preferred compounds are $(py_4ReO_2bq! \ cl^-$ and $(en_2ReO_2)^+ \ Cl^-$. Suitable compounds of molybdenum and tungsten include those containing the ions $cp_2MoCl_2^+$, $cpMo(CO)_4^+$, $(OH)_2Mo^+$ and $cp \ WCl_3^+$. In the above formulae py represents pyridine, en ethylene diamine, cp cyclopentadiene and OH benzene.

The present invention further provides a process for the production of a catalyst which comprises first adsorbing aluminum ions by ion exchange onto the surface of the silica and then washing with water to remove substantially all the chemically uncombined aluminum ions and then adsorbing the ions of one or more of the metals rhenium, molybdenum or tungsten by ion exchange and thereafter washing with water to remove substantially all the chemically uncombined metal ions, drying the composition so formed and activating by heating to a temperature above 300° C in an oxidizing gas.

According to another aspect of the present invention there is provided a disproportionation process which comprises contacting a catalyst comprising silica, aluminum, and one or more of the metals molybdenum, tungsten or rhenium prepared as hereinbefore described with an olefin or acetylene feedstock under conditions of temperature and pressure such that disproportionation is effected.

The preferred method of adsorbing the aluminum ions onto the silica is by percolation with an aqueous solution of aluminum sulphate or aluminum nitrate in deionized water.

Alternatively the silica may be contacted with a hydrolysable aluminum compound such as triethyl aluminum or aluminum trichloride and the intermediate product then hydrolysed.

Suitable amounts of aluminum are from 0.01 to 10 percent and suitable amounts of rhenium, tungsten or molybdenum are from 0.01 to 15 percent respectively by weight based on the weight of silica. Preferred amounts of aluminum are 0.2 to 5 percent and preferred amounts of rhenium, molybdenum and tungsten are 0.2 to 15 percent respectively by weight based on the weight of silica. Suitable aluminum to rhenium tungsten or molybdenum atomic ratios are 0.01:1 to 10:1, preferably 0.01:1 to 1:1.

According to another aspect of the present invention there is provided a disproportionation catalyst comprising silica having adsorbed thereon aluminum ions, sodium ions and ions of one or more of the metals molybdenum, tungsten or rhenium.

According to another aspect of the present invention a silica containing disproportionation catalyst is prepared by (i) adsorbing aluminum ions onto silica by ion exchange and washing with water to remove substantially all of the chemically uncombined aluminum ions (ii) absorbing sodium ions by ion exchange and washing with water to remove substantially all the sodium ions from the surface of the silica (iii) adsorbing ions of one or more of the metals rhenium, tungsten or molybdenum by ion exchange and washing with water to remove substantially all of the chemically uncombined metal ions, drying the composition so formed and activating by heating in an oxidizing gas to a temperature above 300° C.

The preferred method of adsorbing the sodium ions onto the aluminum treated silica is by ion exchange with a solution containing sodium ions e.g. an aqueous solution of sodium bicarbonate.

All the ion exchange steps in the present invention are preferably carried out at 10°–90° C.

Suitable amounts of sodium are from 0.01 to 5 percent wt. based on the weight of silica preferably less than 3 percent weight.

The object of washing after treatment with the sodium ions is at remove the sodium ions from the surface of the silica but not from the aluminum. This is evidenced by the wash water being free of sodium ions.

A preferred catalyst is one containing from 0.2 to 5 percent aluminum 0.2 to 15 percent rhenium and 0.1 to 3 percent of sodium all by weight based on the weight of silica.

The present invention also provides a disproportionation process which comprises contacting a catalyst comprising silica, aluminum, sodium and one or more of the metals molybdenum, tungsten or rhenium prepared as hereinbefore described with an olefin or acetylene feedstock under conditions such that disproportionation is effected.

The activation is carried out by heating in an oxidizing gas above 300° C for sufficiently long to activate the composition. The oxidizing gas may be oxygen or preferably air.

Preferably the catalyst is heated after preparation to temperatures in the range 350° to 650° C in air for up to 16 hours until active.

Any olefin which will undergo disproportionation may be used as a feed for the present invention. The olefin may, for example, be of the formula $RR_1C = CR_2R_3$ where the R substituents are hydrogen atoms, alkyl or aryl groups. The olefin of formula $RR_1C = CR_2R_3$ may be coreacted with an olefin of formula $R_4R_3C = CR_6R_7$ where the R groups are as defined above, with the proviso that not more than two of the groupings $RR_1C =$, $R_3R_2C =$, $R_4R_5 =$ or $R_7R_6C =$ are the same. Preferred olefins are propylene, butene-2, isobutene and pentene-1.

Suitable conditions for the disproportionation reaction are temperatures in the range from −50° to 500° C preferably 0° to 350° C and pressures in the range 1 mm of mercury to 3,000 psig preferably 0 to 2000 psig. Preferred pressures are such as to keep the reaction in the liquid phase. The GHSV may be from 10 to $10^6$ and the LHSV 0.05 to 100. In a batch process suitable olefin/catalyst weight ratios are in the range 1:1 to $10^5$:1. If desired, the process may be carried out in the presence of an inert diluent, for example a paraffinic or cycloparaffinic hydrocarbon.

The invention is illustrated but not limited by the following examples.

EXAMPLES

EXAMPLE 1

Catalyst Preparation

Preparation of $(py_4Re^rO_2)^+Cl^-$ (py = pyridine)

4.5 g of $KReO_4$ and 7 g of KI were boiled with concentrated HCl and then evaporated to dryness. This process was repeated until iodine evolution ceased. The product was refluxed for 3 hours with a large excess of aqueous pyridine and the solution filtered hot. The resulting crystals were extracted with ethanol and the ethanol removed under vacuum. Deep red crystals of $(py_4Re^rO_2)^+Cl^-$ resulted.

Preparation of $(en_2Re^rO_2)^+Cl^-$ (en = ethylene diamine)

25 g of $(C_6H_5)_3P$ in 50 ml of boiling ethanol were added to a refluxing solution containing 5.75 g $KReO_4$, 10 ml of concentrated HCl and 50 ml of ethanol. The solution was refluxed for several hours. 10 ml of ethylene diamine were added to the refluxing solution and the solution refluxed for a further 30 minutes. A yellow product was formed which was filtered off and dissolved in water.

The aqueous solution was filtered into a large volume of ethanol. The resulting yellow crystals of $(en_2Re^rO_2)^+Cl^-$ were washed with ethanol and ether and dried.

Treatment of silica with aluminum ions 150 g samples of silica gel were
a. Washed with 2 liters of 2N $HNO_3$ to remove impurity metal ions
b. Washed with 2 liters of distilled water
c. Subjected to soxhlet extraction with deionized water for 6 hours
d. heated at 550° C for 48 hours in air The catalyst used in Example 2 to 5 were prepared from a 0.1 M solution of aluminum sulphate which was percolated through a column of activated alumina until the pH of the effluent rose to 3.8 to 4.0. The solution was then filtered and percolated through different columns of the silica gel. The percolation was continued until the pH of the effluent was the same as that of the feed. The silica samples were then washed with deionized water, subjected to soxhlet extraction with deionized water for varying periods of time and dried at 110° C.

The catalyst used in Example 6 was prepared by treating 25 g of silica with 3.2 mls of 2M triethyl aluminum in n heptane dissolved in 200 mls of $n$ heptane at ambient temperature under nitrogen with stirring for 16 hours. The solution was poured off, the silica washed 3 times with dry $n$ heptane, then washed with distilled water and dried at 110° C.

Treatment of silica with rhenium ions

The catalysts used in Examples 2 to 6 were prepared by contacting 5 g samples of the aluminum on silica prepared as described above with varying amounts of $(py_4Re^rO_2)^+Cl^-$ by contacting with aqueous solutions of different concentrations of the complex for varying periods of time.

The catalyst was washed with deionized water and dried. 4 ml samples of the catalyst were activated at 540° C in a stream of air (at least 1,000v/v/h) for 16 hours and then cooled to room temperature in a stream of dry nitrogen.

For the catalyst used in Example 2 the solution contained 3 g of complex in 75 mls of water. Contact time 117 hours.

For the catalyst used in Example 3 the solution contained 1.5 g of complex in 50 mls of water. Contact time 72 hours.

For the catalyst used in Example 4 the solution contained 1.27 g of complex in 50 mls of water. Contact time 24 hours.

For the catalyst used in Example 5 the solution contained 0.65 g of complex in 50 mls of water. Contact time 4 hours.

For the catalyst used in Example 6 the solution contained 0.465 g of complex in 50 mls of water. Contact time 24 hours.

Use of the Catalysts for Disproportionation

EXAMPLES 2-6

Catalysts prepared as described above were used in a conventional micro-reactor to effect disproportionation of propylene under the following conditions:

| Flow Rate | 1000 GHSV |
| Pressure | 1 atmosphere |
| Block Temperature | ambient |

The results are summarized in the following table.

TABLE

| Ex. | Re % wt | Al % wt | Re/Al Atomic Ratio | Hours on Stream | Temp. °C. | Conversion % wt |
|---|---|---|---|---|---|---|
| 2 | 4.58 | 1.32 | 0.5 | 1 | 30 | 16 |

| Example | Re % wt | Al % wt | | Hours on Stream | Temperature °C | Conversion % wt |
| --- | --- | --- | --- | --- | --- | --- |
| | | | | 2 | 29 | 12 |
| | | | | 3 | 28 | 9 |
| | | | | 5 | 28 | 7 |
| 3 | 3.2 | 1.7 | 0.27 | 1 | 31 | 12.5 |
| | | | | 2 | 28 | 9 |
| | | | | 3 | 26 | 7 |
| 4 | 2.8 | 1.0 | 0.41 | 1 | 34 | 12 |
| | | | | 2 | 28 | 6.5 |
| | | | | 3 | 26 | 5.5 |
| 5 | 1.2 | 1.2 | 0.15 | 1 | 30 | 9.5 |
| | | | | 2 | 27 | 6.5 |
| | | | | 3 | 26 | 5.0 |
| 6 | 0.7 | 0.4 | 0.25 | 1 | 32 | 4 |
| | | | | 2 | 29 | 2.5 |
| | | | | 3 | 27 | 2.0 |

EXAMPLES 7–8

Catalysts derived from $(py_4Re^rO_2)^+Cl^-$ were prepared according to the method described above with the exception that the percolation step with aluminum sulphate solution was omitted. The catalysts were activated and tested as described above in Examples 2–6.

The results are summarized.

TABLE II

| Example | Re % wt | Hours on Stream | Temperature °C | Conversion % wt |
| --- | --- | --- | --- | --- |
| 7 | 1.2 | 0 | 25 | 0 |
| | | 1 | 180 | 3.5 |
| 8 | 2.0 | 0 | 25 | 0 |
| | | 1 | 180 | 5.5 |

In all of examples 2–8 selectivities according to the equation $C = C - C \rightleftharpoons C = C + C - C = C - C$ were found after 1 hour on stream to be greater than 98 per cent.

EXAMPLES 9 AND 10

Sodium Ion Exchange with Aluminum Treated Silica 150 gms of silica gel previously washed with 2 or 2N nitric acid were washed with 2 of deionized water and soxhlet extracted with deionized water for 6 hours and heated to 550° C for 48 hours. A 0.1M solution of aluminum sulphate (which had previously been percolated through a column of alumina in which its pH rose from 2.8 to 3.8) was filtered and 3 percolated through a column of silica gel. Excess aluminum sulphate was removed with deionized water by soxhlet extraction for 18 hours and dried at 110° C. The Al-silica was contacted with a large volume of a saturated solution of sodium bicarbonate either by percolation or slurrying with several portions. The material was then washed with deionized water and soxhlet extracted for 30 – 60 hours to remove sodium ions from the silica surface (i.e. SiONa → SiOH). (The material used in Example 9 was washed for 30 hours whereas that used in Example 10 was washed for 60 hours).

Rhenium exchange

An aqueous solution containing 3 g in 75 mls of $(py_4Re^rO_2)^+Cl^-$ was percolated through 6.5 g of Na$^+$ exchanged Al-silica over a period of 24 hours. The resulting material was washed with deionized water, ethanol and acetone and dried.

Use of catalysts in disproportionation 5 g of Na$^+$-exchanged Al-silica was contacted with an aqueous solution (3 gms in 75 mls) of $(py_4Re^rO_2)^+Cl^-$ for 24 hours. The resulting solid was then percolated with an aqueous solution of $(py_4Re^rO_2)^+Cl^-$ over a period of 24 hours and washed and dried as above.

All catalysts were activated in a stream of air at 530° C for 16 hours.

Catalysts were then cooled to room temperature in a flow of $N_2$ and tested for propylene disproportionation at 1 atmosphere and 1,000 v/v/h of $C_3^=$.

| Ex. | % wt Re | % wt Al | % wt Na | Al/Na/Re atomic ratio | H.O.S. | °C | Conversion |
| --- | --- | --- | --- | --- | --- | --- | --- |
| 9 | 3.69 | 1.99 | 0.49 | 1/0.29/0.27 | 1 | 31 | 14.5 |
| | | | | | 2 | 21 | 11 |
| | | | | | 3 | 29 | 8.5 |
| | | | | | 4 | 29 | 7.0 |
| 10 | 3.8 | 2.0 | 0.26 | 1/0.15/0.28 | 2 | 25 | 17 |
| | | | | | 2 | 25 | 11.5 |
| | | | | | 3 | 24 | 10 |
| | | | | | 4 | 23 | 8 |

It is also believed that the treatment with sodium ions prior to effecting the ion exchange with rhenium reduces residual strong acidity from the catalyst and thereby reduces (1) double bond isomerization of the olefin reactants and products and (2) polymerization of olefin on the catalyst surface (which will cause catalyst decay).

The catalysts prepared by the treatment involving exchange with sodium are superior to those in which the sodium exchange is omitted in that the initial exotherm is less, and the initial selectivities higher. The comparison of the two types of catalyst is shown in the table below.

| Example No. | Initial Temp. of catalyst bed (no external heating) | Initial conversion % wt. | Initial selectivity % wt. |
| --- | --- | --- | --- |
| 2 | 68°C | 51 | 84.5 |
| 3 | 80 | 50 | 84.6 |
| 4 | 80 | 50 | 85.5 |
| 5 | 73 | 38 | 86.4 |
| 6 | 90 | 32 | 76.8 |
| 9 | 33 | 15 | >99 |
| 10 | 34 | 26 | >95 |

It is believed that the higher initial conversions and lower initial selectivities are a result of the higher initial temperature, since after 1 hour on stream the temperature returns to about 30° C and the selectivity greatly improves.

We claim:

1. A process for the preparation of a catalyst precursor composition containing silica, from 0.01 to 10 parts by wt. of aluminum per 100 parts by wt. of the silica and from 0.01 to 15 parts by wt. of one or more of the metals molybdenum, tungsten or rhenium per 100 parts by wt. of the silica, said composition being suitable for use as a disproportionation catalyst, which process comprises: (i) contacting silica, the silica having hydrogen atoms in surface hydroxyl groups capable of ionizing and exchanging with cations, with an aqueous solution containing aluminum ions at a temperature of from 10° to 90° C. under conditions such that the aluminum ions are adsorbed onto the surface of the silica by ion exchange, (ii) washing the silica with water to remove substantially all the chemically uncombined aluminum ions, (iii) contacting the water-washed silica with an aqueous solution containing cations of one or more of the metals tungsten, molybdenum, or rhenium at a temperature of from 10° to 90° C. under conditions such that the metal ions are adsorbed onto the surface of the silica by ion exchange and thereafter (iv) washing with water to remove substantially all of the chemically uncombined metal ions and (v) drying the composition so formed.

2. A process as claimed in claim 1 for the preparation of a catalyst precursor composition in which process and in lieu of the step of contacting the silica (prior to contacting with the solution contain-ing molybdenum, tungsten or rhenium ions) with an aqueous solution containing aluminum ions at a temperature of from 10° to 90° C. under conditions such that the aluminum ions are adsorbed onto the surface of the silica by ion exchange, the step of contacting the silica with an aluminum compound capable of hydrolysis by water, and then contacting the silica with water to effect hydrolysis.

3. A process as claimed in claim 2 for the preparation of a catalyst precursor composition containing from 0.01 to 5 percent by wt of sodium per 100 parts by wt of silica which process comprises contacting the silica, after adsorbing the aluminum ions but before adsorbing the tungsten, molybdenum, or rhenium ions, with (i) an aqueous solution containing sodium ions at a temperature of 10° to 90° C under conditions such that the sodium ions are adsorbed onto the surface of the silica by ion exchange and (ii) washing the silica with water to remove substantially all the chemically uncombined sodium ions.

* * * * *

UNITED STATES PATENT OFFICE
CERTIFICATE OF CORRECTION

Patent No. 3,673,114                    Dated June 27, 1972

Inventor(s) Keith George Allum and Peter John Robinson

It is certified that error appears in the above-identified patent and that said Letters Patent are hereby corrected as shown below:

| | | |
|---|---|---|
| Col. 1, Line 17, for "silica-aluminaas a" | read | -- silica-alumina as a -- |
| Col. 1, Line 34, for "VII" | read | -- VIII -- |
| Col. 1, Line 67, for "absorbed" | read | -- adsorbed -- |
| Col. 2, Line 26, for "$(py_4Re^VO_3)+$ (wherein py =" | read | -- $(py_4Re^VO_2)^+$ (wherein py = -- |
| Col. 2, Lines 27-28, for "$(en_2Re^VO_2+$(wherein en =(ethylene diamine)" | read | -- $(en_2Re^VO_2)^+$(wherein en = ethylene diamine) -- |
| Col. 2, Line 28, for "$Re(amine)_4O_2$" | read | -- $Re(amine)_4O_2^+$ -- |
| Col. 2, Line 29, for "$(py_4ReO_2bq)^+$ $Cl^-$ and $(en_2ReO_2)^+$ $Cl^-$" | read | -- $(py_4Re^VO_2)^+$ $Cl^-$ and $(enRe^VO_2)^+$ $Cl^-$ |
| Col. 3, Line 20, for "at" | read | -- to -- |

UNITED STATES PATENT OFFICE
CERTIFICATE OF CORRECTION

Patent No. 3,673,114      Dated June 27, 1972

Inventor(s) Keith George Allum and Peter John Robinson - 2 -

It is certified that error appears in the above-identified patent and that said Letters Patent are hereby corrected as shown below:

Col. 4, Line 18,
for "catalyst"      read      -- catalysts --

Col. 5, Line 43,
for "2 or 2N"      read      -- 2 1 or 2N --

Col. 5, Line 44,
for "2 of"      read      -- 2 1 of --

Col. 5, Line 48,
for "3"      read      -- 3 1 --

Col. 6, first table,
(a) under heading "H.O.S.",
for "2", second instance      read      -- 1 --

(b) under heading "°C",
for "25", first instance      read      -- 26 --

Col. 6, second table,
column headed "Initial selectivity % wt.",
for "84.6"      read      -- 85.6 --

Signed and sealed this 9th day of January 1973.

(SEAL)
Attest

EDWARD M. FLETCHER, JR.
Attesting Officer

ROBERT GOTTSCHALK
Commissioner of Patents